US010520307B2

(12) United States Patent
Ohtomo et al.

(10) Patent No.: US 10,520,307 B2
(45) Date of Patent: Dec. 31, 2019

(54) SURVEYING INSTRUMENT

(71) Applicant: TOPCON Corporation, Tokyo-to (JP)

(72) Inventors: Fumio Ohtomo, Saitama (JP); Kaoru Kumagai, Tokyo-to (JP); Tetsuji Anai, Tokyo-to (JP)

(73) Assignee: TOPCON Corporation, Tokyo-to (JP)

( * ) Notice: Subject to any disclaimer, the term of this patent is extended or adjusted under 35 U.S.C. 154(b) by 306 days.

(21) Appl. No.: 15/421,812

(22) Filed: Feb. 1, 2017

(65) Prior Publication Data
US 2017/0227357 A1    Aug. 10, 2017

(30) Foreign Application Priority Data
Feb. 8, 2016    (JP) .................................. 2016-021924

(51) Int. Cl.
*G01C 5/00*    (2006.01)
(52) U.S. Cl.
CPC ...................... *G01C 5/00* (2013.01)
(58) Field of Classification Search
CPC .................................................... G01C 15/00
See application file for complete search history.

(56) References Cited

U.S. PATENT DOCUMENTS

| 5,249,046 | A | 9/1993 | Ulich et al. |
|---|---|---|---|
| 8,857,069 | B2 | 10/2014 | Adegawa |
| 10,048,377 | B2 | 8/2018 | Ohtomo et al. |
| 10,088,307 | B2 | 10/2018 | Ohtomo et al. |
| 2005/0057745 | A1* | 3/2005 | Bontje ................. G01C 15/002 356/139.03 |
| 2006/0242850 | A1 | 11/2006 | Ammann et al. |
| 2008/0075326 | A1 | 3/2008 | Otani et al. |
| 2008/0278715 | A1 | 11/2008 | Swenson et al. |

(Continued)

FOREIGN PATENT DOCUMENTS

| EP | 2056066 A2 | 5/2009 |
|---|---|---|
| EP | 3098564 A1 | 11/2016 |

(Continued)

OTHER PUBLICATIONS

European communiction dated Oct. 25, 2018 in co-pending European patent application No. 18183216.3.

(Continued)

*Primary Examiner* — Luke D Ratcliffe
(74) *Attorney, Agent, or Firm* — Nields, Lemack & Frame, LLC

(57) ABSTRACT

The invention provides a surveying instrument, which comprises a measuring unit for performing a distance measurement by projecting a distance measuring light toward an object to be measured, an image pickup unit for picking up an image including the object to be measured, an attitude detecting unit provided integrally with the image pickup unit, and an arithmetic processing unit, wherein the attitude detecting unit has tilt sensors for detecting a horizontal and a relative tilt angle detecting unit for detecting a tilt angle of the measuring unit with respect to the horizontal, and wherein the arithmetic processing unit calculates a tilting of the image with respect to a vertical based on a detection result of the attitude detecting unit and displays vertical lines in the image acquired by the image pickup unit based on this calculation result.

7 Claims, 10 Drawing Sheets

(56) References Cited

U.S. PATENT DOCUMENTS

| | | | |
|---|---|---|---|
| 2011/0285981 A1 | 11/2011 | Justice et al. | |
| 2012/0105923 A1 | 5/2012 | Mikkelsen et al. | |
| 2012/0216413 A1 | 8/2012 | Adegawa | |
| 2013/0174432 A1 | 7/2013 | Kumagai et al. | |
| 2013/0293681 A1 | 11/2013 | Borowski | |
| 2014/0063489 A1 | 3/2014 | Steffey et al. | |
| 2015/0042977 A1 | 2/2015 | Siercks et al. | |
| 2015/0043012 A1* | 2/2015 | Rudow | G01S 17/023 356/614 |
| 2015/0355786 A1* | 12/2015 | Sabatelli | G06F 3/0481 715/798 |
| 2016/0238385 A1 | 8/2016 | Ohtomo et al. | |
| 2016/0238708 A1 | 8/2016 | Ohtomo et al. | |
| 2018/0224549 A1 | 8/2018 | Yoshino et al. | |
| 2018/0372492 A1 | 12/2018 | Ohtomo et al. | |

FOREIGN PATENT DOCUMENTS

| | | | |
|---|---|---|---|
| JP | 2007-248156 A | 9/2007 | |
| JP | 4996371 B2 | 8/2012 | |
| WO | 2004/099849 A1 | 11/2004 | |
| WO | 2013/177650 A1 | 12/2013 | |

OTHER PUBLICATIONS

Office action dated Feb. 15, 2018 in co-pending U.S. Appl. No. 15/019,360.

Offcie action dated Feb. 16, 2018 in co-pending U.S. Appl. No. 15/019,393.

European communication dated Jun. 21, 2018 in co-pending patent application No. 18154816.5.

Notice of allowance dated May 31, 2018 in co-pending U.S. Appl. No. 15/019,360.

Notice of allowance dated Jun. 5, 2018 in co-pending U.S. Appl. No. 15/019,393.

Axel, et al., "Fusion of Terrestrial LiDAR Point Clouds with Color Imagery," http://www.cis.rit.edu/DocumentLibrary/admin/uploads/CIS000202.PDF, May 16, 2013.

European communication dated Jul. 8, 2016 in co-pending European patent application No. 16155684.0.

European communication dated Jul. 5, 2016 in co-pending European patent application No. 16155681.6.

Ex parte Quayle action mailed Oct. 31, 2018 in co-pending U.S. Appl. No. 16/115,805.

Notice of allowance dated Feb. 11, 2019 in co-pending U.S. Appl. No. 16/115,805.

* cited by examiner

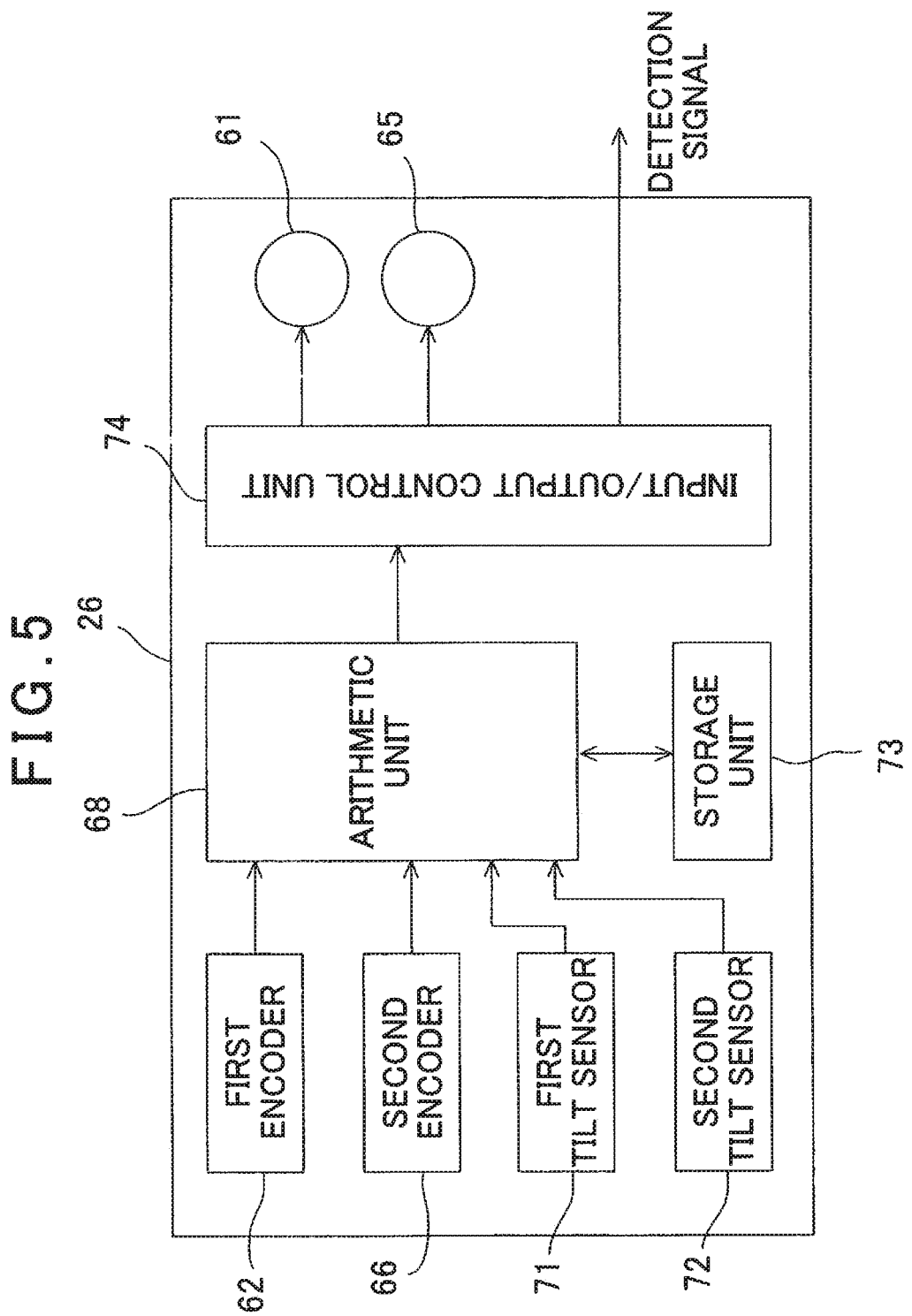

FIG.8
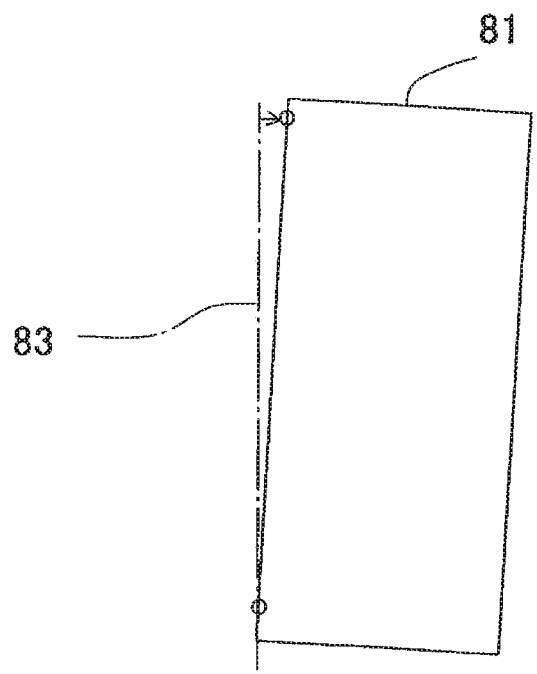
FIG.9A  FIG.9B  FIG.9C
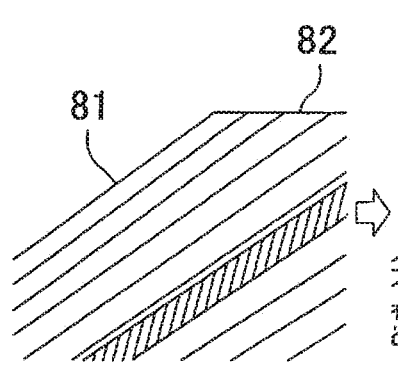 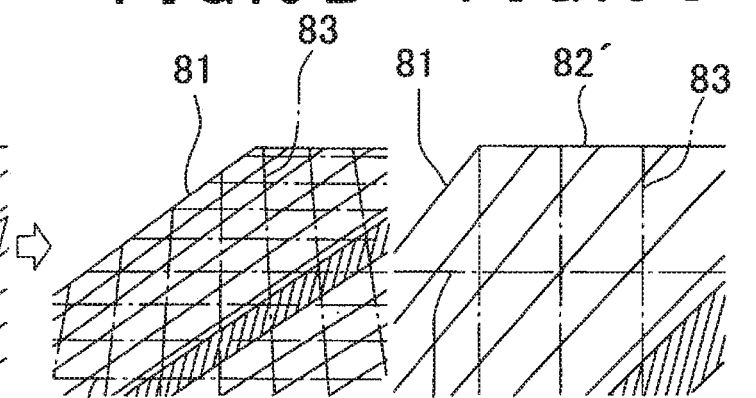
PICKED UP IMAGE | VERTICAL LINES ARE DISPLAYED | TURNED TO VERTICAL IMAGE

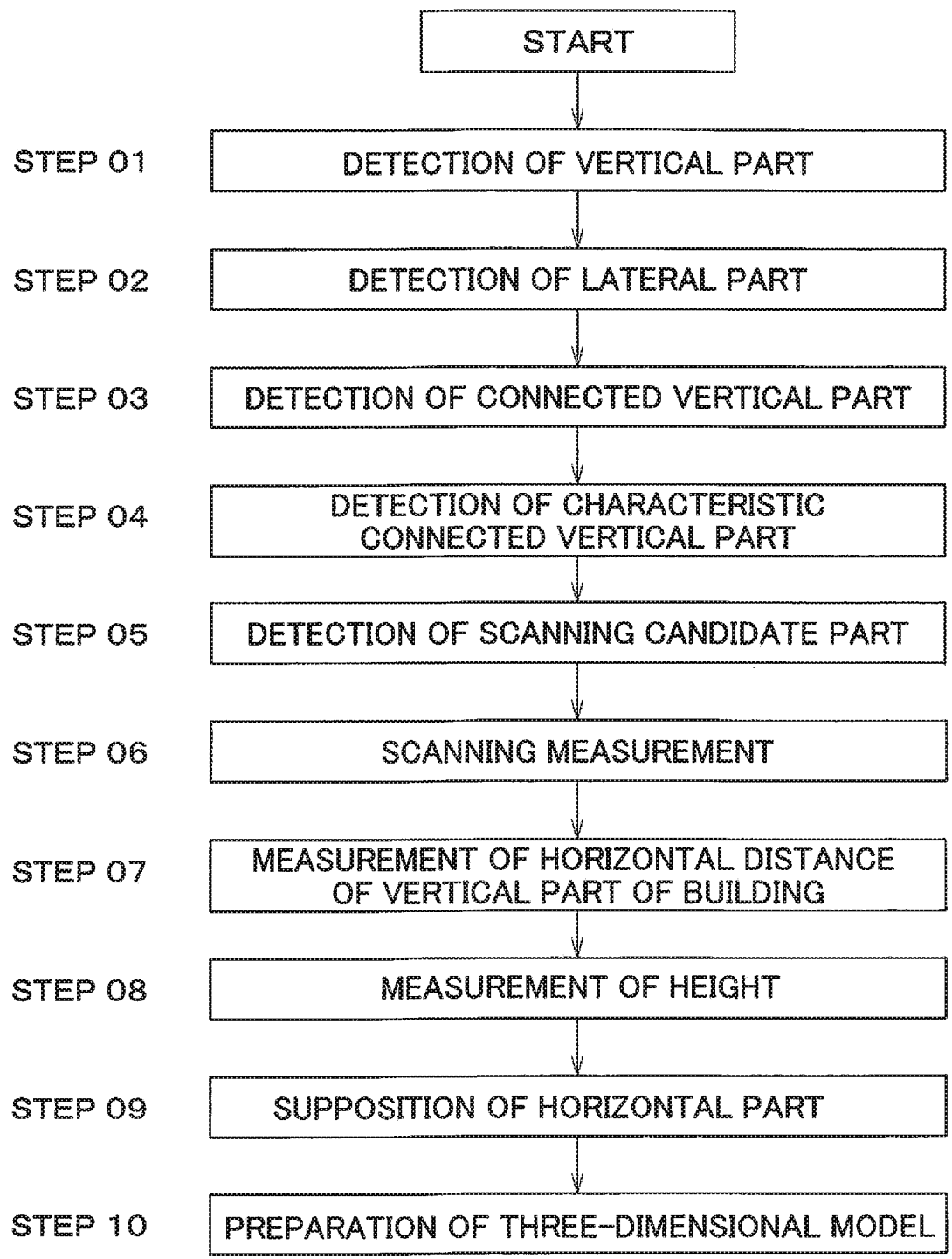

SURVEYING INSTRUMENT

BACKGROUND OF THE INVENTION

The present invention relates to a surveying instrument, by which it is possible to measure a vertical condition of an object to be measured.

In general, structural objects such as a construction, a building, a structure, and the like, which are objects to be surveyed, are constructed with a vertical as a reference. Therefore, it is important for a maintenance to measure a tilting (an inclining) with respect to a vertical reference.

Conventionally, in a case where the inclining of an object to be measured such as the construction, the building, the structure, and the like is measured, the inclining is measured by measuring plural measuring points of the object to be measured (for instance, an upper and lower portion of a pillar) with the vertical or a horizontal as the reference and by obtaining a relation between the measuring points. Further, in recent years, a method is adopted such that the object to be measured is measured by a three-dimensional (3D) scanner with the vertical reference, and a shape and the tilting (the inclining) of the object to be measured are measured. However, much time is required for these measurements. Further, in the measurement by the 3D scanner, an amount of data obtained by the 3D scanner becomes enormous, and much time is required for analyzing. For this reason, the 3D scanner could not be used for judging an inclining condition at a site.

SUMMARY OF THE INVENTION

It is an object of the present invention to provide a surveying instrument, by which it is possible to judge a vertical condition of an object to be measured immediately at a measurement site.

To attain the object as described above, a surveying instrument according to the present invention comprises a measuring unit for performing a distance measurement by projecting a distance measuring light toward an object to be measured and by receiving a reflected distance measuring light from the object to be measured, an image pickup unit having an image pickup optical axis running in parallel to a projection optical axis of the distance measuring light and for picking up an image including the object to be measured, an attitude detecting unit provided integrally with the image pickup unit, and an arithmetic processing unit, wherein the attitude detecting unit has tilt sensors for detecting a horizontal and a relative tilt angle detecting unit for tilting the tilt sensors so that the tilt sensors detect the horizontal and for detecting a tilt angle of the measuring unit with respect to the horizontal in a condition where the tilt sensors detect the horizontal, and wherein the arithmetic processing unit calculates a tilting of the image with respect to a vertical based on a detection result of the attitude detecting unit and displays vertical lines in the image acquired by the image pickup unit based on this calculation result.

Further, in the surveying instrument according to the present invention, the arithmetic processing unit performs an image processing so that the vertical lines shown in the image run in parallel to each other and prepares a vertical image.

Further, the surveying instrument according to the present invention further comprises an optical axis deflecting unit provided on the projection optical axis of the distance measuring light, wherein the distance measuring light is projected to a point as required of the object to be measured by the optical axis deflecting unit, and the distance measurement of the point as required is performed.

Further, the surveying instrument according to the present invention further comprises an optical axis deflecting unit provided on the projection optical axis of the distance measuring light, wherein the arithmetic processing unit extracts a vertical part of the object to be measured, scans the distance measuring light by controlling the optical axis deflecting unit so that the distance measuring light crosses the vertical part, performs the distance measurement of an intersection point crossing the vertical part, and obtains a horizontal distance of the vertical part.

Further, in the surveying instrument according to the present invention, the arithmetic processing unit extracts a lateral part of the object to be measured, calculates a height of the intersection point of the lateral part and the vertical part based on the horizontal distance of the vertical part, captures the lateral part connecting the intersection points with the same height as a horizontal part of the object to be measured, scans the distance measuring light and performs the distance measurement so that the distance measuring light crosses the point as required of the horizontal part, and obtains the horizontal distance and the height of the object to be measured.

Furthermore, in the surveying instrument according to the present invention, the arithmetic processing unit prepares a three-dimensional model of the object to be measured based on the vertical part and the horizontal part.

According to the present invention, the surveying instrument comprises a measuring unit for performing a distance measurement by projecting a distance measuring light toward an object to be measured and by receiving a reflected distance measuring light from the object to be measured, an image pickup unit having an image pickup optical axis running in parallel to a projection optical axis of the distance measuring light and for picking up an image including the object to be measured, an attitude detecting unit provided integrally with the image pickup unit, and an arithmetic processing unit, wherein the attitude detecting unit has tilt sensors for detecting a horizontal and a relative tilt angle detecting unit for tilting the tilt sensors so that the tilt sensors detect the horizontal and for detecting a tilt angle of the measuring unit with respect to the horizontal in a condition where the tilt sensors detect the horizontal, and wherein the arithmetic processing unit calculates a tilting of the image with respect to a vertical based on a detection result of the attitude detecting unit and displays vertical lines in the image acquired by the image pickup unit based on this calculation result. As a result, it is possible to judge the vertical condition of the object to be measured immediately at the measurement site based on the vertical lines displayed in the image.

BRIEF DESCRIPTION OF THE DRAWINGS

FIG. 5 is a schematical block diagram of the attitude detecting unit.

FIG. 8 is an explanatory drawing to show a relation between an object to be measured and a vertical line.

FIG. 9A, FIG. 9B and FIG. 9C are explanatory drawings to show a relation between a picked up image and a vertical image.

FIG. 11 is a flowchart to show the process to detect the vertical part and the horizontal part by the vertical image.

DETAILED DESCRIPTION OF THE PREFERRED EMBODIMENT

A description will be given below on an embodiment of the present invention by referring to the attached drawings.

First, referring to FIG. 1, a description will be given on an outline of a surveying system according to the present embodiment.

Figure 1:
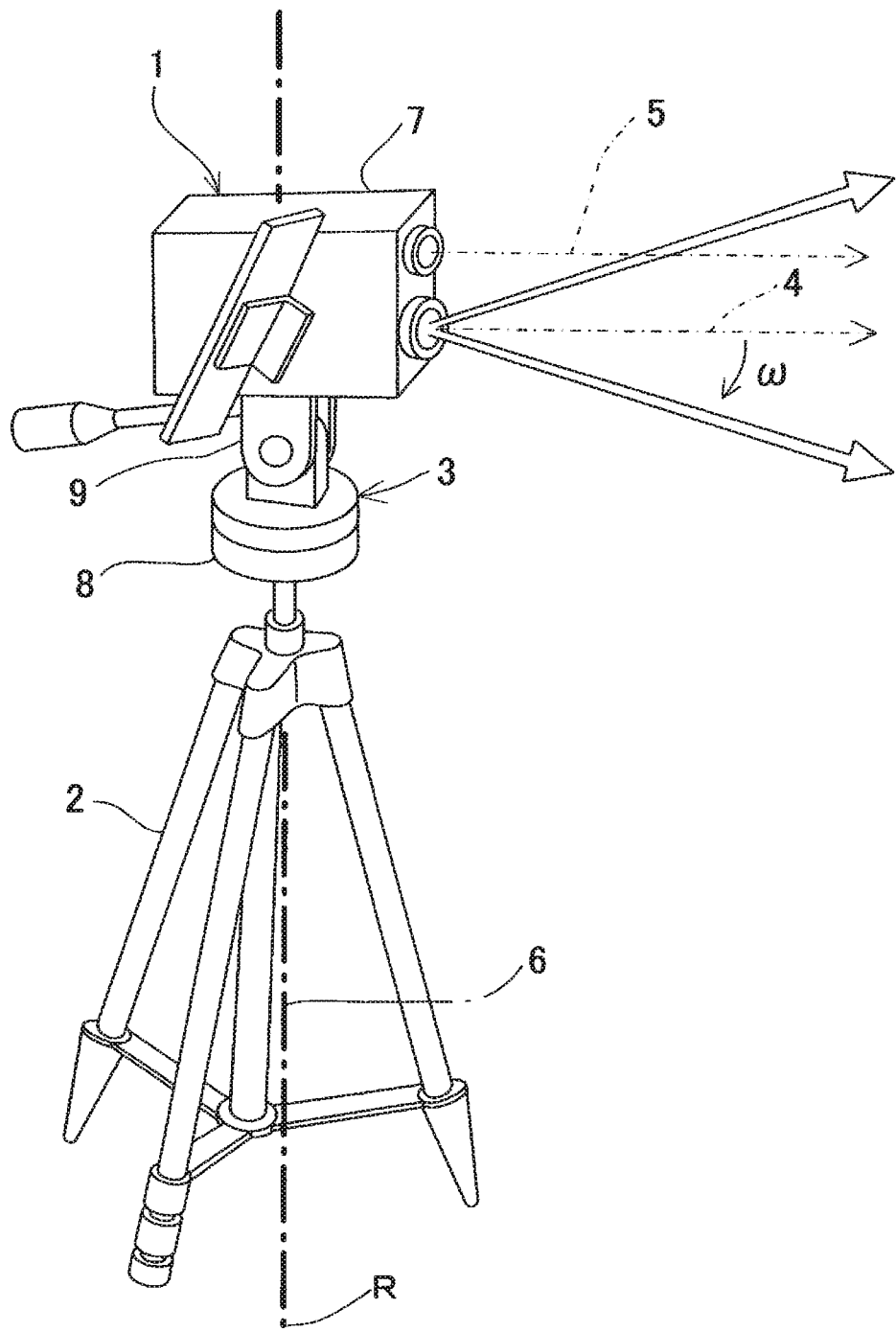
FIG. 1 is a schematical perspective view of an embodiment of the present invention.

In FIG. 1, reference numeral 1 denotes a surveying instrument, and reference numeral 2 denotes a tripod installed at an installation reference point R. The surveying instrument 1 is installed on the tripod 2 via a base unit 3. Further, in the figure, reference numeral 4 denotes a distance measuring optical axis, and reference numeral 5 denotes an image pickup optical axis. The distance measuring optical axis 4 and the image pickup optical axis 5 are running in parallel to each other, and a distance between the distance measuring optical axis 4 and the image pickup optical axis 5 is known.

The surveying instrument 1 can perform a measurement according to a prism measurement mode in which an object to be measured is a prism. Further, in a case where the object to be measured is a structure, or the like, the surveying instrument 1 can perform the measurement according to a non-prism measurement mode without using the prism.

The base unit 3 has a protractor table 8, which rotates in a horizontal direction and can detect a rotation angle, and a vertical rotation unit 9, which can rotate in a vertical direction and can be fixed at an angle as desired. The surveying instrument 1 is mounted on the vertical rotation unit 9.

Further, the surveying instrument 1 has a mechanical reference point, and the distance measuring optical axis 4, the image pickup optical axis 5, or the like are in a known relation with respect to the mechanical reference point. The mechanical reference point is set on a rotation center of the vertical rotation unit 9, for instance.

The mechanical reference point is set so as to be positioned on a vertical line 6 passing through the installation reference point R in a condition where the distance measuring optical axis 4 is horizontal. The distance between the installation reference point R and the mechanical reference point of the surveying instrument 1 is measured by a tape measure, or the like and is known.

The surveying instrument 1 rotates in the vertical direction with the mechanical reference point as a center and further rotates in the horizontal direction with the mechanical reference point as the center. Further, as described later, a vertical rotation angle is detected by an attitude detecting unit 26, and a horizontal rotation angle is detected by the protractor table 8.

Figure 2:
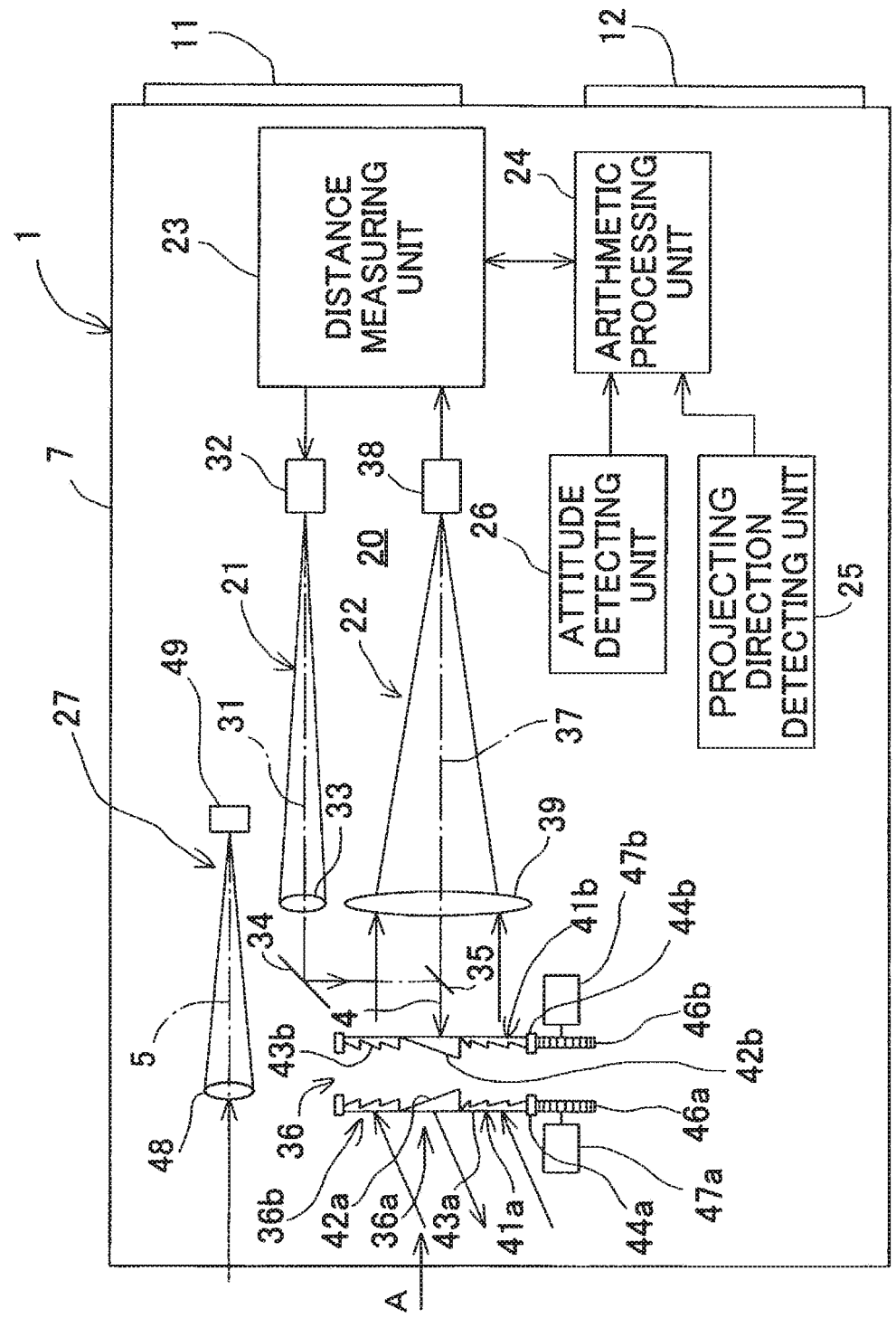
FIG. 2 is a schematical block diagram of a surveying instrument according to the present embodiment.
Figure 3:
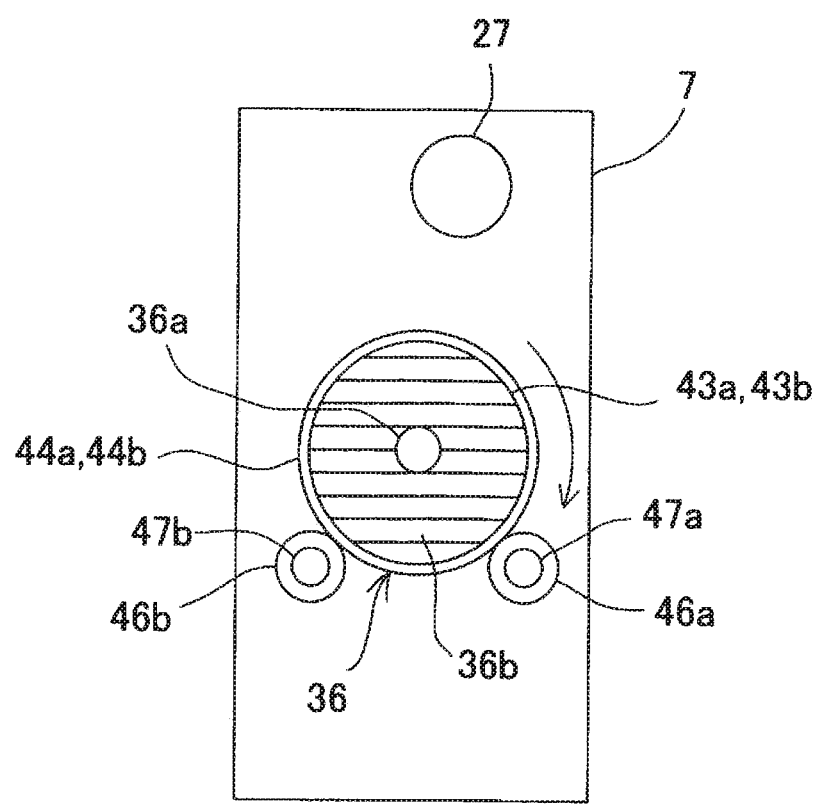
FIG. 3 is an arrow diagram along line A in FIG. 2.

Referring to FIG. 2 and FIG. 3, a description will be given on the surveying instrument 1.

The surveying instrument 1 has a display unit 11 and an operation unit 12 on a back surface of a casing 7. Further, the surveying instrument 1 primarily comprises a measuring unit 20 having the distance measuring optical axis 4, an arithmetic processing unit 24, a projecting direction detecting unit 25 for detecting a projecting direction of a distance measuring light, the attitude detecting unit 26 for detecting a tilting in two horizontal directions of the surveying instrument 1, an image pickup unit 27 having the image pickup optical axis 5, an optical axis deflecting unit 36 for deflecting the distance measuring optical axis 4, or the like inside the casing 7. Therefore, the measuring unit 20, the attitude detecting unit 26, the image pickup unit 27, and the optical axis deflecting unit 36 are integrated together. It is to be noted that the display unit 11 may be designed as a touch panel and may be also served as the operation unit 12.

The measuring unit 20 comprises a distance measuring light projecting unit 21, a light receiving unit 22, and a distance measuring unit 23.

The distance measuring light projecting unit 21 projects the distance measuring light. The distance measuring light projecting unit 21 has a projection optical axis 31, and a light emitting element 32, for instance, a laser diode (LD) is provided on the projection optical axis 31. Further, a projecting lens 33 is provided on the projection optical axis 31.

Further, a first reflection mirror 34 as a deflecting optical component is provided on the projection optical axis 31. Further, a second reflection mirror 35 as the deflecting optical component is faced with the first reflection mirror 34 and disposed on a light receiving optical axis 37 (to be described later).

By the first reflection mirror 34 and the second reflection mirror 35, the projection optical axis 31 is coincided with the distance measuring optical axis 4. The optical axis deflecting unit 36 is disposed on the distance measuring optical axis 4.

The light receiving unit 22 receives a reflected distance measuring light from the object to be measured. The light receiving unit 22 has the light receiving optical axis 37 running in parallel to the projection optical axis 31, and the light receiving optical axis 37 is commonly used as the distance measuring optical axis 4.

A photodetector 38, for instance, a photo diode (PD), is provided on the light receiving optical axis 37. Further, an image forming lens 39 is disposed on the light receiving optical axis 37. The image forming lens 39 forms an image of the reflected distance measuring light on the photodetector 38. The photodetector 38 receives the reflected distance measuring light and produces a light receiving signal. The light receiving signal is inputted to the distance measuring unit 23.

Further, on the light receiving optical axis 37, the optical axis deflecting unit 36 is arranged on an objective side of the image forming lens 39.

The distance measuring unit 23 controls the light emitting element 32 and emits a laser beam as the distance measuring light. By the optical axis deflecting unit 36 (a distance measuring light deflecting unit 36a (to be described later)), the distance measuring optical axis 4 is deflected so as to direct toward a measuring point.

The reflected distance measuring light as reflected from the object to be measured enters the light receiving unit 22 via the optical axis deflecting unit 36 (a reflected distance measuring light deflecting unit 36b (to be described later)) and the image forming lens 39. The reflected distance measuring light deflecting unit 36b deflects again the distance measuring optical axis 4 as deflected by the distance measuring light deflecting unit 36a so that the distance measuring optical axis 4 is returned to an original condition, and the reflected distance measuring light is received by the photodetector 38.

The photodetector 38 sends the light receiving signal to the distance measuring unit 23. The distance measuring unit 23 performs a distance measurement of the measuring point (a point where the distance measuring light is projected) based on the light receiving signal from the photodetector 38.

The arithmetic processing unit 24 is configured by an input/output control unit, an arithmetic unit (CPU), a storage unit, or the like. In the storage unit, various types of programs are stored. These programs include: a distance measuring program for controlling a distance measuring operation, a control program for controlling drivings of motors 47a and 47b (to be described later), an image program for performing an image processing such as an image matching, or the like, an input/output control program, a directional angle calculating program for calculating directional angles (a horizontal angle and a vertical angle) of the distance measuring optical axis 4 based on calculation results in a projecting direction from the projecting direction detecting unit 25, or the like. Further, in the storage unit, measurement results such as distance measuring data, image data, or the like, are stored.

A description will be given on the optical axis deflecting unit 36.

In the optical axis deflecting unit 36, a pair of optical prisms 41a and 41b is provided. Each of the optical prisms 41a and 41b is designed in a disk-like shape, disposed perpendicularly crossing the light receiving optical axis 37, overlapped on each other, and arranged in parallel to each other. As for the optical prisms 41a and 41b, a Fresnel prism is preferably used respectively in order to reduce a size of an instrument.

A central part of the optical axis deflecting unit 36 is designed as the distance measuring light deflecting unit 36a where the distance measuring light passes. A part of the optical axis deflecting unit 36 except the central part is designed as the reflected distance measuring light deflecting unit 36b.

The Fresnel prism used as the optical prisms 41a and 41b is composed of prism elements 42a and 42b and a large number of prism elements 43a and 43b arranged in parallel to each other respectively and has a plate shape. The optical prisms 41a and 41b, each of the prism elements 42a and 42b, and the prism elements 43a and 43b have the same optical characteristics respectively.

The prism elements 42a and 42b make up the distance measuring light deflecting unit 36a, and the prism elements 43a and 43b make up the reflected distance measuring light deflecting unit 36b.

The Fresnel prism may be manufactured by an optical glass but may be molded by an optical plastic material. By molding the Fresnel prism by the optical plastic material, a low cost Fresnel prism can be manufactured.

Each of the optical prisms 41a and 41b is arranged in such a manner that each of the optical prisms 41a and 41b rotates individually with the light receiving optical axis 37 as the center respectively. By independently controlling rotating directions, rotation amounts and rotating speeds, the optical prisms 41a and 41b deflect the distance measuring optical axis 4 of the distance measuring light as emitted in an arbitrary deflecting direction, and deflect the light receiving optical axis 37 of the reflected distance measuring light as received in parallel to the distance measuring optical axis 4.

Outer shapes of the optical prisms 41a and 41b are arranged in the disk-like shape with the light receiving optical axis 37 as the center, respectively. Taking an expansion of the reflected distance measuring light into consideration, diameters of the optical prisms 41a and 41b are set so that a sufficient light amount can be obtained.

A ring gear 44a is fitted with an outer periphery of the optical prism 41a and a ring gear 44b is fitted with an outer periphery of the optical prism 41b.

A driving gear 46a meshes with the ring gear 44a, and the driving gear 46a is fixed to an output shaft of the motor 47a. A driving gear 46b meshes with the ring gear 44b, and the driving gear 46b is fixed to an output shaft of the motor 47b. The motors 47a and 47b are electrically connected to the arithmetic processing unit 24.

As the motors 47a and 47b, motors capable of detecting a rotation angle or motors which rotate corresponding to a driving input value, for instance, a pulse motor is used. Alternatively, a rotation amount of the motor may be detected by using a rotation detector for detecting a rotation amount (rotation angle) of the motor such as an encoder (not shown), for instance, or the like. The rotation amounts of the motors 47a and 47b are detected respectively by the projecting direction detecting unit 25, and the motors 47a and 47b are individually controlled by the arithmetic processing unit 24 based on detection results of the projecting direction detecting unit 25.

The driving gears 46a and 46b and the motors 47a and 47b are provided at positions not interfering with the distance measuring light projecting unit 21, for instance, on a lower side of the ring gears 44a and 44b.

The projecting lens 33, the distance measuring light deflecting unit 36a, or the like, make up a projecting optical system. The reflected distance measuring light deflecting unit 36b and the image forming lens 39, or the like, make up a light receiving optical system.

The projecting direction detecting unit 25 counts driving pulses input to the motors 47a and 47b and detects the rotation angles of the motors 47a and 47b. Alternatively, the projecting direction detecting unit 25 detects the rotation angles of the motors 47a and 47b based on signals from the encoders.

Further, the projecting direction detecting unit 25 calculates rotation positions of the optical prisms 41a and 41b based on the rotation angles of the motors 47a and 47b, and calculates a deflection angle (a deflecting direction) and the projecting direction of the distance measuring light based on refractive indexes and the rotation positions of the distance measuring light deflecting unit 36a (that is, the prism elements 42a and 42b). A calculation result is inputted to the arithmetic processing unit 24.

In the surveying instrument 1, the attitude detecting unit 26 detects an attitude (a tilt angle and a tilting direction) of the distance measuring unit 23 with respect to the projection optical axis 31. The detection result is inputted to the arithmetic processing unit 24.

Figure 4:
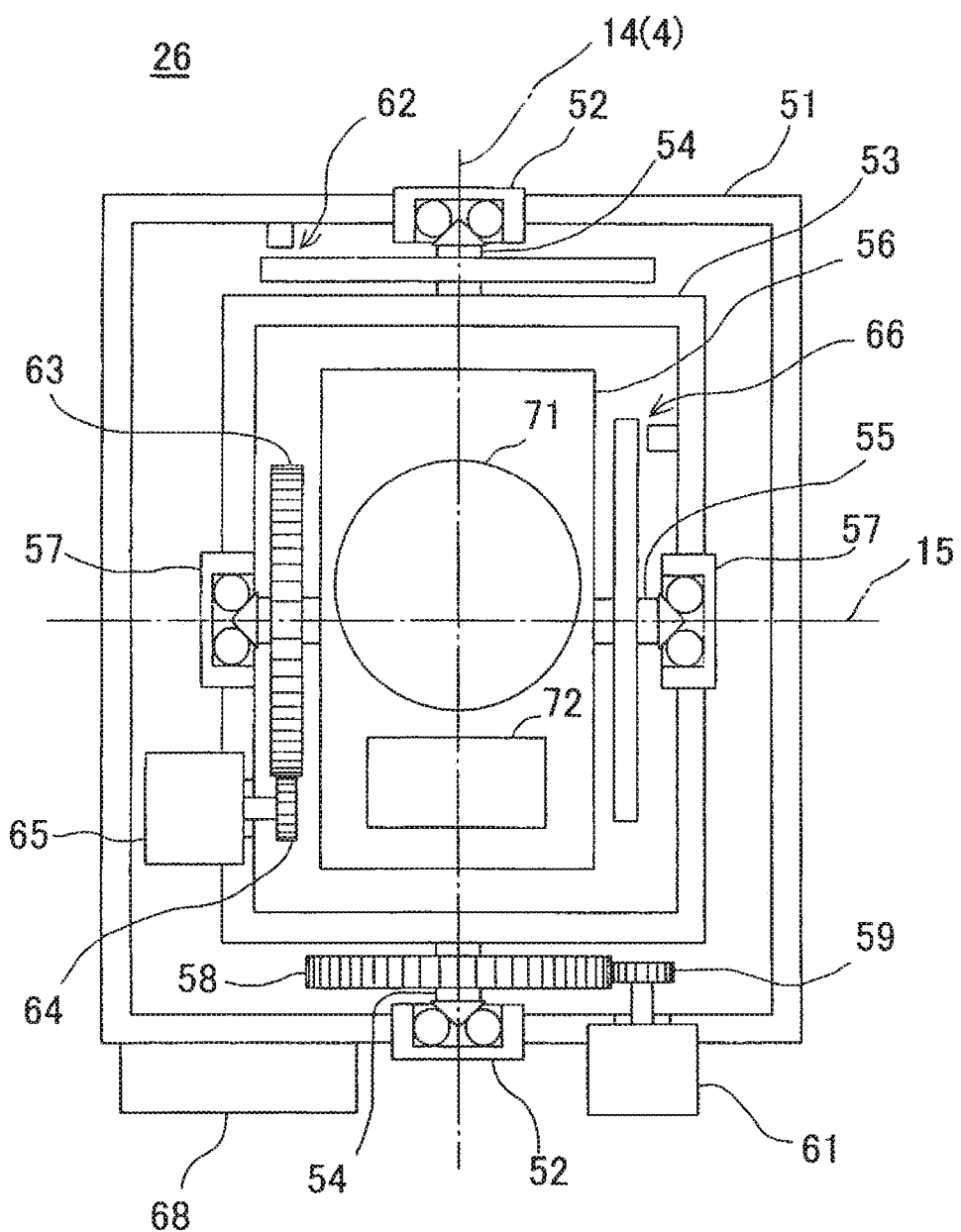
FIG. 4 is a plan view of an attitude detecting unit to be used in the present embodiment.

A description will be given below on the attitude detecting unit 26 by referring to FIG. 4 and FIG. 5. It is to be noted that FIG. 4 shows a plan view, and in the description as given below, the top and bottom corresponds to the top and bottom in FIG. 4, and the left and right corresponds to the left and right in FIG. 4.

Inside an outer frame 51 with a rectangular frame shape, an inner frame 53 with a rectangular frame shape is provided, and inside the inner frame 53, a tilt detecting unit 56 is provided.

From an upper surface and a lower surface of the inner frame 53, longitudinal shafts 54 and 54 are protruded. The longitudinal shafts 54 and 54 are rotatably fitted with bearings 52 and 52 as provided on the outer frame 51. The longitudinal shafts 54 and 54 have a longitudinal axis 14, and the inner frame 53 is capable of rotating freely by 360° in a left-and-right direction around the longitudinal shafts 54 and 54 as the center. The longitudinal axis 14 of the longitudinal shafts 54 and 54 is arranged so as to coincide with or run in parallel to the distance measuring optical axis 4, or to run in parallel to a horizontal reference line (not shown) perpendicularly crossing the distance measuring optical axis 4.

The tilt detecting unit 56 is supported by a lateral shaft 55, and both end portions of the lateral shaft 55 are rotatably fitted with bearings 57 and 57 as provided on the inner frame 53. The lateral shaft 55 has a lateral axis 15 perpendicularly crossing the longitudinal axis 14, and the tilt detecting unit 56 is capable of rotating freely by 360° in an up-and-down direction around the lateral shaft 55 as the center. The lateral axis 15 of the lateral shaft 55 is arranged so as to coincide with or run in parallel to the distance measuring optical axis 4, or to run in parallel to the horizontal reference line perpendicularly crossing the distance measuring optical axis 4.

That is, the tilt detecting unit 56 is configured so as to be supported via a gimbal mechanism, which is capable of rotating freely by 360° in two axial directions with respect to the outer frame 51.

On one of the longitudinal shafts 54 and 54, for instance, to the lower longitudinal shaft 54, a first gear 58 is attached, and a first driving gear 59 meshes with the first gear 58. Further, a first motor 61 is provided on a lower surface of the outer frame 51, and the first driving gear 59 is attached to an output shaft of the first motor 61.

On the other of the longitudinal shafts 54 and 54, a first encoder 62 is attached. The first encoder 62 is configured so as to detect a rotation angle in the left-and-right direction of the inner frame 53 with respect to the outer frame 51. That is, referring to FIG. 1, the first encoder 62 detects a flap angle w.

On one end of the lateral shaft 55, a second gear 63 is attached, and a second driving gear 64 meshes with the second gear 63. Further, on a side surface (left side surface in the figure) of the inner frame 53, a second motor 65 is attached, and the second driving gear 64 is attached to an output shaft of the second motor 65.

On the other end of the lateral shaft 55, a second encoder 66 is attached. The second encoder 66 is configured so as to detect a rotation angle in the up-and-down direction of the tilt detecting unit 56 with respect to the inner frame 53.

The first encoder 62 and the second encoder 66 are electrically connected to an arithmetic unit 68, and a detection result is inputted to the arithmetic unit 68.

The tilt detecting unit 56 has a first tilt sensor 71 and a second tilt sensor 72, and the first tilt sensor 71 and the second tilt sensor 72 are electrically connected to the arithmetic unit 68. The detection results by the first tilt sensor 71 and the second tilt sensor 72 are inputted to the arithmetic unit 68.

Further description will be given on the attitude detecting unit 26 by referring to FIG. 5.

The attitude detecting unit 26 comprises the first encoder 62, the second encoder 66, the first tilt sensor 71, the second tilt sensor 72, the arithmetic unit 68, the first motor 61, and the second motor 65. Further, the attitude detecting unit 26 comprises a storage unit 73 and an input/output control unit 74.

In the storage unit 73, programs such as a calculation program for an attitude detection and the like, and data such as calculation data and the like are stored.

The input/output control unit 74 drives the first motor 61 and the second motor 65 based on a control instruction output from the arithmetic unit 68 and outputs a result of a tilt detection calculated by the arithmetic unit 68 as a detection signal.

The first tilt sensor 71 is for detecting the horizontal with high accuracy, for instance, a tilt detector in which a detection light incidents to a horizontal liquid surface and the horizontal is detected according to a change of a reflection angle of a reflected light, or a bubble tube which detects a tilting according to a positional change of an air bubble sealed in a tube. Further, the second tilt sensor 72 is for detecting a tilt change with high responsiveness, for instance, an acceleration sensor.

It is to be noted that both the first tilt sensor 71 and the second tilt sensor 72 can individually detect tiltings in the two axial directions, which are a rotating direction (a tilting direction) detected by the first encoder 62 and a rotating direction (a tilting direction) detected by the second encoder 66.

The arithmetic unit 68 calculates a tilt angle and a tilting direction based on detection results from the first tilt sensor 71 and the second tilt sensor 72. Further, the arithmetic unit 68 calculates a tilt angle of the surveying instrument 1 with respect to a verticality based on a rotation angle of the first encoder 62 and on a rotation angle of the second encoder 66, which correspond to the tilt angle and the tilting direction.

By synthesizing the rotation angle of the first encoder 62 and the rotation angle of the second encoder 66 as calculated, the tilt angle and the tilting direction are calculated. The tilt angle and the tilting direction correspond to a tilt angle and a tilting direction (a relative tilt angle) of the casing 7 with respect to the horizontal, i.e. a tilt angle and a tilting direction (a relative tilt angle) of the measuring unit 20.

Thus, the first motor 61, the second motor 65, the first encoder 62, the second encoder 66, and the arithmetic unit 68 make up a relative tilt angle detecting unit.

It is to be noted that in a case where the outer frame 51 is installed horizontally, the attitude detecting unit 26 is set in such a manner that the first tilt sensor 71 detects the horizontal, and further, is set in such a manner that an output of the first encoder 62 and an output of the second encoder 66 both indicate a reference position (rotation angle at 0°).

A description will be given below on an operation of the attitude detecting unit 26.

First, a description will be given below on a case where a tilting is detected with high accuracy.

When the attitude detecting unit 26 is tilted, the first tilt sensor 71 outputs a signal corresponding to a tilting.

The arithmetic unit 68 calculates a tilt angle and a tilting direction based on the signal from the first tilt sensor 71 and further calculates rotation amounts of the first motor 61 and the second motor 65 in order to make the tilt angle and the tilting direction 0 based on a calculation result. The arithmetic unit 68 outputs a driving command for driving the first motor 61 and the second motor 65 by the rotation amounts via the input/output control unit 74.

According to the driving command from the arithmetic unit 68, the first motor 61 and the second motor 65 are driven so as to be tilted oppositely to the calculated tilt angle and the tilting direction. Rotation amounts (the rotation angles) of the motors are detected by the first encoder 62 and the second encoder 66 respectively, and when the rotation angles reach the calculation results, the drivings of the first motor 61 and the second motor 65 are stopped.

In this state, under a condition where the outer frame 51 and the inner frame 53 are tilted, the tilt detecting unit 56 is controlled to the horizontal.

Therefore, in order to make the tilt detecting unit 56 horizontal, the tilt angles, at which the inner frame 53 and the tilt detecting unit 56 are tilted by the first motor 61 and the second motor 65, are obtained based on the rotation angles as detected by the first encoder 62 and the second encoder 66.

The arithmetic unit 68 calculates the tilt angle and the tilting direction of the attitude detecting unit 26 with respect to the horizontal based on the detection results of the first encoder 62 and the second encoder 66 when the first tilt sensor 71 detects the horizontal. The calculation result indicates the attitude of the attitude detecting unit 26 after the attitude detecting unit 26 is tilted.

Therefore, the tilt angle and the tilting direction as calculated by the arithmetic unit 68 are a tilt angle and a tilting direction of the surveying instrument 1 with respect to the horizontal.

The arithmetic unit 68 outputs the calculated tilt angle and the tilting direction to an outside via the input/output control unit 74 as a detection signal of the attitude detecting unit 26.

In the attitude detecting unit 26, as a structure shown in FIG. 4, there is nothing which restricts rotations of the tilt detecting unit 56 and the inner frame 53. Therefore, the tilt detecting unit 56 and the inner frame 53 can both rotate by 360° or more. That is, no matter what attitude the attitude detecting unit 26 takes (even in a case where the attitude detecting unit 26 is upside down, for instance), the attitude detection in all directions can be performed.

In a case where high responsiveness is required, although the attitude detection and an attitude control are performed based on the detection result of the second tilt sensor 72, the second tilt sensor 72 has poorer detection accuracy than the first tilt sensor 71 in general.

In the present embodiment, by comprising the first tilt sensor 71 with high accuracy and the second tilt sensor 72 with high responsiveness, the attitude control is performed based on the detection results of the second tilt sensor 72, and the attitude detection with high accuracy can be performed by the first tilt sensor 71.

That is, based on the tilt angle as detected by the second tilt sensor 72, the first motor 61 and the second motor 65 are driven so that the tilt angle becomes 0°. Further, by continuing the driving of the first motor 61 and the second motor 65 until the first tilt sensor 71 detects the horizontal, the attitude can be detected with high accuracy. If a deviation occurs between values of the first encoder 62 and the second encoder 66 when the first tilt sensor 71 detects the horizontal (that is, an actual tilt angle) and the tilt angle as detected by the second tilt sensor 72, the tilt angle of the second tilt sensor 72 can be calibrated based on the deviation.

Therefore, by obtaining a relation between the detected tilt angle of the second tilt sensor 72 and the tilt angle which is obtained based on the horizontal detection by the first tilt sensor 71 and the detection result of the first encoder 62 and the second encoder 66 in advance, the tilt angle detected by the second tilt sensor 72 can be calibrated. Therefore, accuracy of the attitude detection with high responsiveness by the second tilt sensor 72 can be improved.

As described above, by the attitude detecting unit 26, the tilt angle and the tilting direction in a condition where the surveying instrument 1 is installed can be detected with high accuracy, and the measurement result can be corrected based on the detection result. As a result, it is unnecessary to level the surveying instrument 1 horizontally. That is, the measurement with high accuracy can be performed whatever installing condition the surveying instrument 1 takes, and it is unnecessary for the surveying instrument 1 to have a leveling device.

Next, the image pickup unit 27 has the image pickup optical axis 5. Under the condition where the optical axis deflecting unit 36 does not deflect the distance measuring optical axis 4, the image pickup optical axis 5 is set so as to run in parallel to the distance measuring optical axis 4. On the image pickup optical axis 5, an image forming lens 48 and an image pickup element 49 are provided.

A field angle of the image pickup unit 27 is set so as to be equivalent to or somewhat larger than an area where an optical axis can be deflected by the optical axis deflecting unit 36. The field angle of the image pickup unit 27 is set to 5°, for instance.

Further, the image pickup element 49 is a CCD or a CMOS sensor which is an aggregate of pixels, and it is so arranged that a position of each pixel on an image element can be specified. For instance, the position of each pixel is specified by a coordinate system with an optical axis of each camera as an origin point.

Figure 6A:
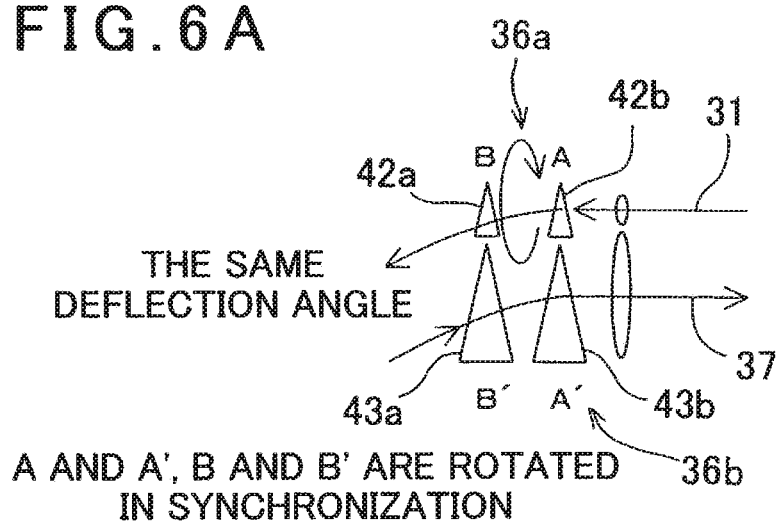
FIG. 6A, FIG. 6B and FIG. 6C are explanatory drawings to show an operation of an optical axis deflecting unit.

First, a description will be given on a measurement operation by the surveying instrument 1 by referring to FIG. 6A, FIG. 6B and FIG. 6C. To simplify the explanation, in FIG. 6A, the optical prisms 41a and 41b are shown by separating the prism elements 42a and 42b and the prism elements 43a and 43b. Further, the prism elements 42a and 42b and the prism elements 43a and 43b as shown in FIG. 6A are in a state in which the maximum deflection angle can be obtained. Further, the minimum deflection angle is a position where either one of the optical prisms 41a or 41b is rotated by 180°, the deflection angle becomes 0°, and an optical axis of a laser beam as projected (the distance measuring optical axis 4) becomes parallel to the projection optical axis 31.

A distance measuring light is emitted from the light emitting element 32, and the distance measuring light is turned to a parallel luminous flux by the projecting lens 33 and projected toward the object to be measured or a measurement target area through the distance measuring light deflecting unit 36a (the prism elements 42a and 42b). Here, by passing through the distance measuring light deflecting unit 36a, the distance measuring light is deflected to a direction as required and projected by the prism elements 42a and 42b.

The reflected distance measuring light as reflected by the object to be measured or by the measurement target area is incident through the reflected distance measuring light deflecting unit 36b (the prism elements 43a and 43b) and is focused on the photodetector 38 by the image forming lens 39.

Since the reflected distance measuring light passes through the reflected distance measuring light deflecting unit 36b, the optical axis of the reflected distance measuring light is deflected by the prism elements 43a and 43b so as to coincide with the light receiving optical axis 37 (FIG. 6A).

By a combination of the rotation positions of the prism element 42a and the prism element 42b, the deflecting direction and deflection angle of the distance measuring light to be projected can be arbitrarily changed.

Further, under the condition where a positional relation between the prism element 42a and the prism element 42b is fixed (under the condition where the deflection angles obtained by the prism element 42a and the prism element 42b are fixed), by rotating the prism element 42a and the prism element 42b integrally by the motors 47a and 47b, a locus drawn by the distance measuring light passing through the distance measuring light deflecting unit 36a becomes a circle with the distance measuring optical axis 4 as the center.

Therefore, by rotating the optical axis deflecting unit 36 while emitting the laser beam from the light emitting element 32, the distance measuring light can be scanned by the locus of the circle.

It is to be noted that it is needless to say that the reflected distance measuring light deflecting unit 36b is rotated integrally with the distance measuring light deflecting unit 36a.

Figure 6B:
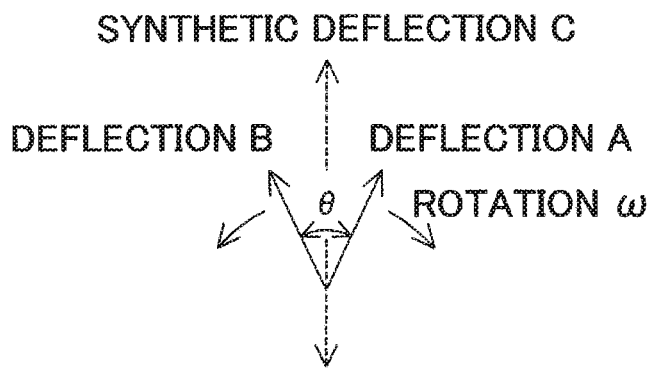

Next, FIG. 6B illustrates a case in which the prism element 42a and the prism element 42b are relatively rotated. Assuming that a deflecting direction of the optical axis as deflected by the prism element 42a is a deflection "A" and the deflecting direction of the optical axis as deflected by the prism element 42b is a deflection "B", the deflection of the optical axis by the prism elements 42a and 42b becomes a synthetic deflection "C" as an angle difference θ between the prism elements 42a and 42b.

Therefore, each time the angle difference θ is changed, by rotating the optical axis deflecting unit 36 once, the distance measuring light can be scanned linearly.

Figure 6C:
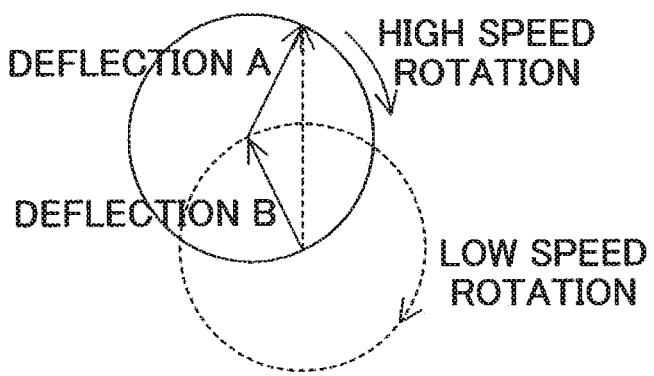

Further, as illustrated in FIG. 6C, when the prism element 42b is rotated at a rotating speed lower than the rotating speed of the prism element 42a, since the distance measuring light is rotated while the angle difference θ is gradually increased, the scanning locus of the distance measuring light becomes a spiral form.

Furthermore, by individually controlling the rotating direction and the rotating speed of the prism element 42a and the prism element 42b, the scanning locus of the distance measuring light is made in an irradiating direction (scanning in a radial direction) with the projection optical axis 31 as the center or in a horizontal direction or in a vertical direction or the like, and various scanning states can be obtained.

As a mode of measurement, by performing a distance measurement by fixing the optical axis deflecting unit 36 (the prism elements 42a and 42b) per each deflection angle as required, the distance measurement can be performed with respect to a specific measuring point. Further, by executing the distance measurement while changing the deflection angles of the optical axis deflecting unit 36, that is, by executing the distance measurement while scanning the distance measuring light, distance measurement data with respect to a measuring point on the scanning locus can be obtained.

Further, a projection directional angle of each distance measuring light can be detected by the rotation angles of the motors 47a and 47b, and by associating the projection directional angle with the distance measurement data, three-dimensional distance measurement data can be obtained.

Further, a tilting of the projection optical axis 31 with respect to the horizontal can be detected by the attitude detecting unit 26, and based on the tilting as detected by the attitude detecting unit 26, the distance measurement data is corrected and the distance measurement data with high accuracy can be obtained.

Next, in the present embodiment, the three-dimensional distance measurement data is obtained and image data can be also obtained.

When the object to be measured is selected, the surveying instrument 1 is directed toward the object to be measured so that the object to be measured is captured by the image pickup unit 27. An image acquired by the image pickup unit 27 is displayed on the display unit 11.

Since the image acquired by the image pickup unit 27 is equal to or approximately equal to a measurement area of the surveying instrument 1, the measuring operator can visually specify the measurement area easily.

Further, since the distance measuring optical axis 4 and the image pickup optical axis 5 are parallel to each other, and both the optical axes are in a known relation, the arithmetic processing unit 24 can match the image center with the distance measuring optical axis 4 on the image by the image pickup unit 27. Further, by detecting the projection directional angle of the distance measuring light, the arithmetic processing unit 24 can specify a measuring point on the image based on the projection directional angle. Therefore, it is possible to easily associate the three-dimensional data of the measuring point with the image, and the image as acquired by the image pickup unit 27 can be turned to an image with the three-dimensional data.

Figure 7A:
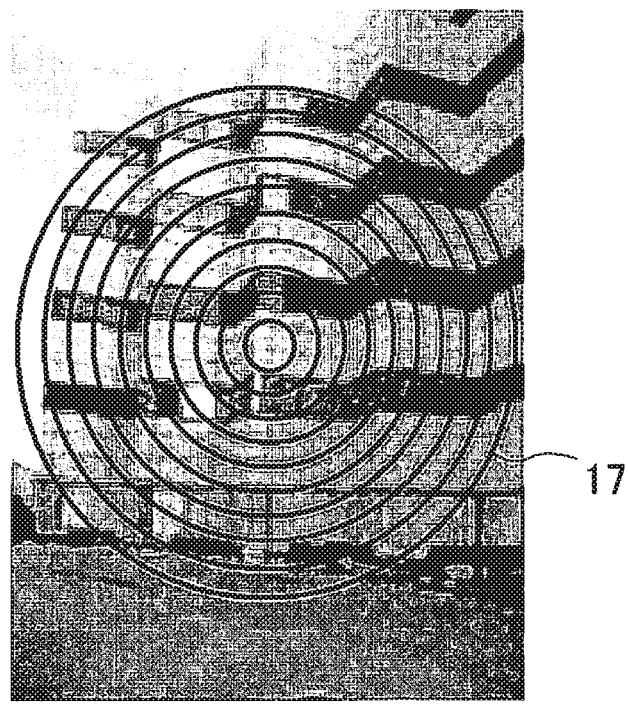
FIG. 7A and FIG. 7B are explanatory drawings to show a relation between an acquired image and a scanning locus.
Figure 7B:
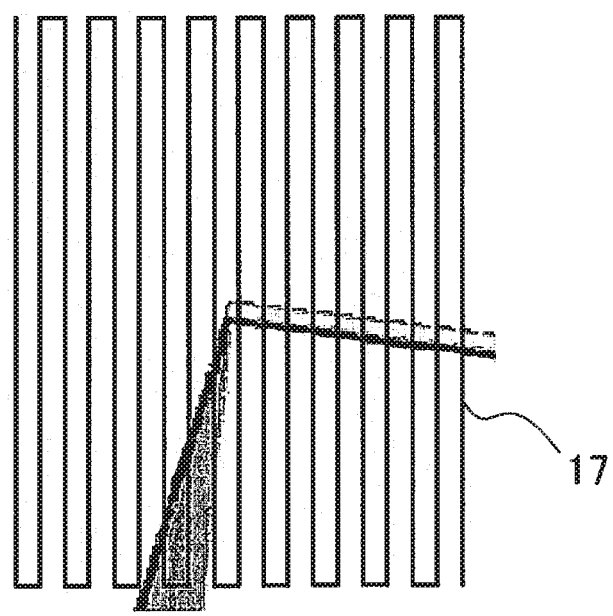

FIG. 7A and FIG. 7B show a relation between an image acquired by the image pickup unit 27 and a locus obtained on the measuring point. It is to be noted that FIG. 7A shows a case in which the distance measuring light is scanned in a concentric and multi-circular form and FIG. 7B shows a case in which the distance measuring light is reciprocally scanned linearly. In the figure, reference numeral 17 denotes a scanning locus and the measuring points are positioned on the scanning locus 17.

In the description as given above, the distance measuring light deflecting unit 36a and the reflected distance measuring light deflecting unit 36b are formed on the same optical prism and integrated together. On the other hand, the projection optical axis 31 and the light receiving optical axis 37 are separated from each other, the distance measuring light deflecting unit 36a and the reflected distance measuring light deflecting unit 36b are provided individually on the projection optical axis 31 and the light receiving optical axis 37, and further it may be so arranged that the distance measuring light deflecting unit 36a and the reflected distance measuring light deflecting unit 36b are synchronously rotated so that the deflecting directions by the distance measuring light deflecting unit 36a and the reflected distance measuring light deflecting unit 36b coincide with each other.

A description will be given below on a measuring operation of the surveying instrument 1.

First, referring to FIG. 8, FIG. 9A, FIG. 9B and FIG. 9C, a description will be given on a case where the verticality of the object to be measured is determined.

It is to be noted that in a description as given below, as shown in FIG. 8, an inclining of an object to be measured 81 means a tilting with respect to a vertical line 83.

FIG. 9A shows an image 82 of the object to be measured 81 as picked up by the image pickup unit 27. Since the image 82 includes the tilting of the image pickup unit 27, the verticality as obtained from the image 82 itself is different from an actual verticality.

When the image 82 is picked up, a tilt angle and a tilting direction of the image pickup unit 27, i.e. a tilt angle and a tilting direction of the surveying instrument 1 with respect to the horizontal, can be detected by the attitude detecting unit 26. The tilt angle and the tilting direction as detected are a tilting and a tilting direction of the image at the time of an image pickup. The arithmetic processing unit 24 calculates a tilting of the image with respect to the horizontal or vertical based on this tilting and tilting direction, and shows a plurality of vertical lines 83 and a plurality of horizontal lines 84 in the image based on this calculation result (FIG. 9B).

Since the image 82 is a perspective image (an image in which a near object is displayed large and a far object is displayed small), a distance between the vertical lines 83 becomes narrower toward the upper part in the image 82 (FIG. 9B). The arithmetic processing unit 24 performs an image processing so that the vertical lines 83 become in parallel to each other. Hereinafter, the image after the image processing (converting to a vertical image) is referred as a vertical image 82' (FIG. 9C).

Referring to FIG. 10A to FIG. 10H and FIG. 11, a description will be given below on detections and measurements of a vertical part and a horizontal part of the vertical image 82' and a building (the object to be measured 81) by a scanning measurement.

(Detection of Vertical Part and Lateral Part)

(Step 01) A Sobel filter (a spatial primary differentiation) is applied to the vertical image 82', and a vertical part image 88 (FIG. 10B) where a vertical part 87 of a building in the image is extracted is acquired.

(Step 02) The Sobel filter (the spatial primary differentiation) is applied to the vertical image 82', and a lateral part image 90 (FIG. 10C) where a horizontal part 89 of the building in the image is extracted is acquired.

(Detection of Connected Vertical Part)

(Step 03) A Box filter for performing a smoothing of a vertical component is applied to the vertical part image 88, and a connected vertical part image 91 (FIG. 10D) where interruptions of the vertical part image is connected is acquired.

(Detection of Characteristic Connected Vertical Part)

Figure 10A:
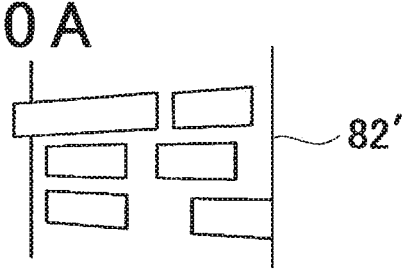
FIG. 10A to FIG. 10H are explanatory drawings to show a process to detect a vertical part and a horizontal part by the vertical image.
Figure 10C:
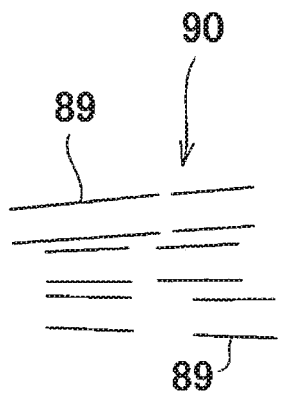
Figure 10B:
Figure 10F:
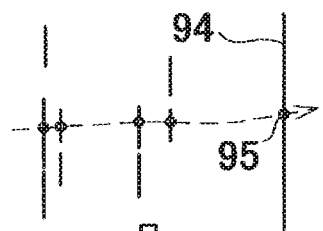
Figure 10D:
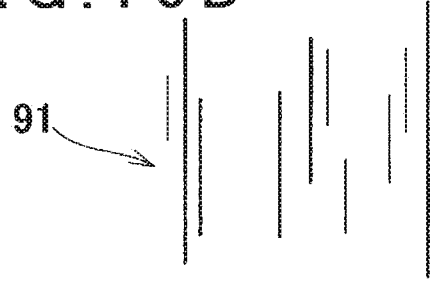
Figure 10G:
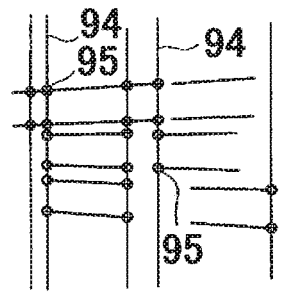
Figure 10E:
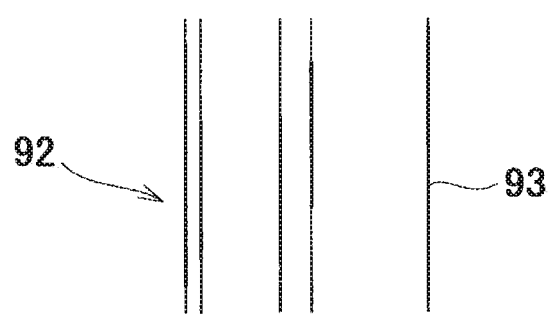

(Step 04) In the connected vertical part image 91, a characteristic connected vertical part image 92 to show characteristics of the building with a predetermined length and strength as a selection standard is acquired, and a supposition vertical part line (hereinafter, referred as "supposition vertical part line 93 of building") by which the building is characterized, is obtained (FIG. 10E).

By obtaining the supposition vertical part line 93 of the building, the building, i.e. a vertical condition of the object to be measured, can be promptly obtained from the condition of the supposition vertical part line 93 of the building as a measured value.

(Detection of Scanning Candidate Part)

(Step 05) By performing AND processing of the vertical part image 88 and the characteristic connected vertical part image 92, a scanning candidate part 94 which becomes a positional candidate to be scanned is obtained (FIG. 10F).

(Scanning Measurement)

(Step 06) In each of the supposition vertical part lines 93 of the building, at least one point is respectively extracted as a measuring point 95 regarding the scanning candidate part 94. Regarding each of the measuring points 95, the position of the measuring point 95 is calculated based on the directional angle of the distance measuring optical axis 4 and the position of the measuring point 95 in the image. Further, from the position of the measuring point 95 in the image, the deflection angle and the deflecting direction with respect to the distance measuring optical axis 4 are calculated.

(Measurement of Horizontal Distance of Vertical Part of Building)

(Step 07) The motors 47a and 47b are driven, and a scanning is performed by rotating the prism elements 42a and 42b in the direction as required (see FIG. 6A to FIG. 6C). Further, based on the deflection angle and the deflecting direction as calculated in a process of the scanning, a horizontal distance of the measuring point 95 is measured while passing the measuring point 95 on the distance measuring optical axis 4 (crossing the vertical part).

Since all points on the vertical lines have the same horizontal distance, if the object to be measured is not tilted and the vertical part and the connected vertical part are accurately vertical, the measurement may be performed regarding only one arbitrary point of the vertical part. Even a in case where the tilting of the object to be measured occurs, the measurement can be completed on a few points of the connected vertical part, and the number of the measuring points can be extensively reduced.

Further, the direction of the scanning may be the direction crossing the scanning candidate part 94 and is not limited to the horizontal direction.

Therefore, the horizontal distances of all points on the vertical lines are the same, and a horizontal plan view of the building can be prepared with the vertical part of the building as the reference.

(Measurement of Height)

(Step 08) An intersection point of the vertical part and the lateral part is obtained. Regarding the intersection point, a height of the intersection point is obtained based on the horizontal distance of the vertical part including the intersection point and on the position of the intersection point in the image. Regarding the intersection points as required, the heights are calculated respectively (FIG. 10G).

(Supposition of Horizontal Part)

Figure 10H:
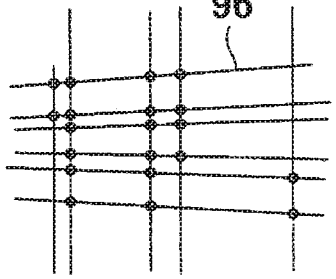

(Step 09) Among the intersection points, the lateral parts connected to the points of the same height are captured as a horizontal part 89 of the building, and a horizontal line 96 can be supposed (FIG. 10H).

(Preparation of Three-Dimensional Model)

(Step 10) As described above, the building normally consists of the vertical part and the horizontal part. Therefore, by supposing (extracting) the vertical part and the horizontal part regarding the building in the image, a three-dimensional model consisting of the vertical part and the horizontal part can be obtained easily.

Thus, it is possible to perform the measurement on the outer shape of the building with the extremely few numbers of the measuring points.

The invention claimed is:

1. A surveying instrument comprising: a measuring unit for performing a distance measurement by projecting a distance measuring light toward an object to be measured and by receiving a reflected distance measuring light from said object to be measured, an image pickup unit having an image pickup optical axis running in parallel to a projection optical axis of said distance measuring light and for picking up an image including said object to be measured, an attitude detecting unit provided integrally with said image pickup unit, and an arithmetic processing unit, wherein said attitude detecting unit has tilt sensors for detecting a horizontal and a relative tilt angle detecting unit for tilting said tilt sensors so that said tilt sensors detect the horizontal and for detecting a tilt angle of said measuring unit with respect to the horizontal in a condition where said tilt sensors detect the horizontal, and wherein said arithmetic processing unit calculates a tilting of said image with respect to a vertical based on a detection result of said attitude detecting unit and displays vertical lines in said image acquired by said image pickup unit based on this calculation result.

2. The surveying instrument according to claim 1, wherein said arithmetic processing unit performs an image processing so that said vertical lines shown in said image run in parallel to each other and prepares a vertical image.

3. The surveying instrument according to claim 1, further comprising an optical axis deflecting unit provided on said projection optical axis of said distance measuring light, wherein said distance measuring light is projected to a point as required of said object to be measured by said optical axis deflecting unit, and the distance measurement of said point as required is performed.

4. The surveying instrument according to claim 2, further comprising an optical axis deflecting unit provided on said projection optical axis of said distance measuring light, wherein said arithmetic processing unit extracts a vertical part of said object to be measured, scans said distance measuring light by controlling said optical axis deflecting unit so that said distance measuring light crosses said vertical part, performs the distance measurement of an intersection point crossing said vertical part, and obtains a horizontal distance of said vertical part.

5. The surveying instrument according to claim 4, wherein said arithmetic processing unit extracts a lateral part of said object to be measured, calculates a height of the intersection point of said lateral part and said vertical part based on the horizontal distance of said vertical part, captures said lateral part connecting the intersection points with the same height as a horizontal part of said object to be measured, scans said distance measuring light and performs the distance measurement so that said distance measuring light crosses the point as required of said horizontal part, and obtains the horizontal distance and the height of said object to be measured.

6. The surveying instrument according to claim 5, wherein said arithmetic processing unit prepares a three-dimensional model of said object to be measured based on said vertical part and said horizontal part.

7. The surveying instrument according to claim 2, further comprising an optical axis deflecting unit provided on said projection optical axis of said distance measuring light, wherein said distance measuring light is projected to a point as required of said object to be measured by said optical axis deflecting unit, and the distance measurement of said point as required is performed.

* * * * *